United States Patent [19]

Whiddon

[11] Patent Number: 4,878,803

[45] Date of Patent: Nov. 7, 1989

[54] STICK DELIVERY APPARATUS

[76] Inventor: Wade Q. Whiddon, P.O. Box 31, Abbeyville, Ala. 36310

[21] Appl. No.: 167,024

[22] Filed: Mar. 11, 1988

[51] Int. Cl.$^4$ ............................................. B65G 57/18
[52] U.S. Cl. .................................. 414/789.5; 198/430; 294/87.1; 414/791.8; 414/792.9
[58] Field of Search .................. 414/42, 60, 71, 789.5, 414/789.6, 791.8, 792.9; 294/87.1, 87.12, 87.22, 87.24; 198/429, 430

[56] References Cited

U.S. PATENT DOCUMENTS

| | | | |
|---|---|---|---|
| 2,457,135 | 12/1948 | Deiters | 294/87.1 X |
| 3,823,834 | 7/1974 | Rysti | 414/42 |
| 3,889,825 | 6/1975 | Mosely | 414/42 X |
| 3,904,047 | 9/1975 | Lunden | 414/42 |
| 3,909,044 | 9/1975 | Lunden | 414/42 X |
| 4,253,787 | 3/1981 | Lunden et al. | 414/42 |
| 4,671,401 | 6/1987 | Truninger | 198/430 X |
| 4,679,381 | 7/1987 | Truninger | 53/447 |
| 4,715,114 | 12/1987 | Yajima | 198/430 X |

FOREIGN PATENT DOCUMENTS

| | | | |
|---|---|---|---|
| 1481757 | 3/1969 | Fed. Rep. of Germany | 294/87.24 |
| 59-64420 | 4/1984 | Japan | 414/42 |
| 226034 | 4/1969 | Sweden | 414/42 |

Primary Examiner—Robert J. Spar
Assistant Examiner—Janice Krizek
Attorney, Agent, or Firm—Michael, Best & Friedrich

[57] ABSTRACT

Disclosed herein is apparatus for delivering separator sticks to a stacking station, which apparatus comprises a frame, a stick conveyor supported on the frame for movement between a stick supply station and a stick transfer station and including structure for transporting sticks from the supply station and for delivering to the transfer station a predetermined plurality of the sticks in predetermined spaced and parallel relation to one another, a carriage supported on the frame for movement relative to the frame between a pick-up position adjacent the transfer station and a delivery position adjacent the stacking station, a sub-frame supported by the carriage for movement in common therewith and for movement relative to the carriage between a lower position and a raised position, and a plurality of fingers carried by the sub-frame for engaging the predetermined plurality of sticks located on the conveyor at the transfer station when the carriage is in the pick-up position and when the sub-frame is in the lower position, and for releasing the sticks at the stacking station when the carriage is in the delivery position.

13 Claims, 4 Drawing Sheets

STICK DELIVERY APPARATUS

BACKGROUND OF THE INVENTION

The invention relates generally to the stacking of articles, such as lumber and pipes.

It has been well known in the past that such articles have often been stored or transported in stacks wherein each layer in the stack was separated from an adjacent layer by a series of separator sticks. In the past, such stacks were constructed by delivering to a stacking elevator a layer of such articles, after which the elevator would be lowered to facilitate receipt of the next layer at generally the same height above a datum at which the preceding layers were deposited. In the past, several workers were employed to locate the desired number of spacing or separator sticks in appropriate positions on the just delivered layer during the time interval before delivery of the next layer. Such manual placement of separator sticks is, of course, expensive and this invention is directed to reducing the expense of placement of such separator sticks.

SUMMARY OF THE INVENTION

The invention provide apparatus for delivering separator sticks to a stacking station, which apparatus comprises a frame, a stick conveyor supported on the frame for movement between a stick supply station and a stick transfer station and including means for transporting sticks from the supply station and for delivering to the transfer station a predetermined plurality of the sticks in predetermined spaced and parallel relation to one another, carriage means supported on the frame for movement relative to the frame between a pick-up position adjacent the transfer station and a delivery position adjacent the stacking station, and means on the carriage means for engaging the predetermined plurality of sticks located on the conveyor at the transfer station when the carriage means is in the pick-up position and for releasing the sticks at the stacking station when the carriage means is in the delivery position.

The invention also provides apparatus for delivering separator sticks to a stacking station, which apparatus comprises a frame, a stick conveyor supported on the frame for movement between a stick supply station and a stick transfer station and including means for transporting sticks from the supply station and for delivering to the transfer station a predetermined plurality of the sticks in predetermined spaced parallel relation to one another, carriage means supported on the frame for movement relative to the frame between a pick-up position adjacent the transfer station and a delivery position adjacent the stacking station, a sub-frame supported by the carriage means for movement in common therewith and for movement relative to the carriage means between a lower position and a raised position, and means on said sub-frame for engaging the predetermined plurality of sticks located on the conveyor at the transfer station when the carriage means is in the pick-up position and when the sub-frame is in the lower position, and for releasing the sticks at the stacking station when the carriage means is in the delivery position.

The invention also provides apparatus for delivering elongated separator sticks to a stacking station, the apparatus comprising, a frame, a stick conveyor supported on the frame for movement between a stick supply station and a stick transfer station and including a pair of endless chains each having thereon a series of spaced lugs adapted to respectively engage the sticks so as to cause, in response to chain movement, transport of the sticks from the supply station and delivery to the transfer station of a predetermined plurality of the sticks in spaced parallel relation to one another, carriage means supported on the frame for movement relative to the frame between a pick-up position adjacent the transfer station and a delivery position adjacent the stacking station, a sub-frame supported by the carriage means for movement in common therewith and for movement relative to the carriage means between a lower position and a raised position, means on the sub-frame for engaging the predetermined plurality of sticks located on the conveyor at the transfer station when the carriage means is in the pick-up position and when the sub-frame is in the lower position, and for releasing the sticks at the stacking station when the carriage means is in the delivery position and the sub-frame is in the raised position, which stick engaging and releasing means includes, for each stick in the predetermined plurality of sticks, two pair of first and second fingers, the two pair of fingers being spaced from each other in the direction of stick elongation, and first and second rock shafts supported by the sub-frame for rotation and respectively fixed to the first and second fingers, which stick engaging and releasing means also includes means for rotating the first and second rock shafts in opposite directions so as to rock the fingers between stick engaging positions wherein the fingers extend toward one another so as to support a stick from the underside thereof and spread positions wherein the fingers are separated from each other sufficiently to permit passage therebetween of a stick, which rock shaft rotating means includes first and second elongated shuttles supported by the sub-frame for generally parallel movement in the direction of shuttle elongation, first and second hydraulic cylinders supported by the sub-frame and respectively connected to the first and second shuttles for displacing the shuttles in opposite directions, and means respectively connecting the first and second shuttles to the first and second rock shafts for rotating the rock shafts in opposite directions in response to shuttle displacement in opposite directions.

The invention also provides apparatus for delivering separator sticks to a stacking station, which apparatus comprises a frame, a stick conveyor supported on the frame for movement between a stick supply station and a stick transfer station and including means for transporting sticks from the supply station and for delivering to the transfer station a plurality of the sticks in predetermined spaced and parallel relation to one another, carriage means supported on the frame for movement relative to the frame between a pick-up position adjacent the transfer station and a delivery position adjacent the stacking station, means on the frame for lifting the sticks from the conveyor to a raised position above the conveyor, and means on the carriage for engaging the sticks located in the raised position when the carriage means is in the pick-up position and for releasing the sticks at the stacking station when said carriage means is in the delivery position.

One of the principal features of the invention is the provision of apparatus for delivering separator sticks onto the most recently delivered layer in a stack and prior to delivery of the next layer to the stack.

Another of the principal features of the invention is to more economically enable placement of separator sticks in a stack of articles, such as lumber or pipes.

Still another of the features of the invention is to provide apparatus which is at least semi-automatic in operation and which is capable of delivering a predetermined plurality of separator sticks in a given pattern between placement of adjacent layers in a stack.

Still another of the principal features of the invention is apparatus for delivering a predetermined plurality of separator sticks from a supply station to a stacking station with the delivered sticks being in a predetermined spaced and parallel relation to each other.

Other objects and advantages of the invention will be made known by reference to the following general description, the drawings, and the claims.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

GENERAL DESCRIPTION

Figure 1:
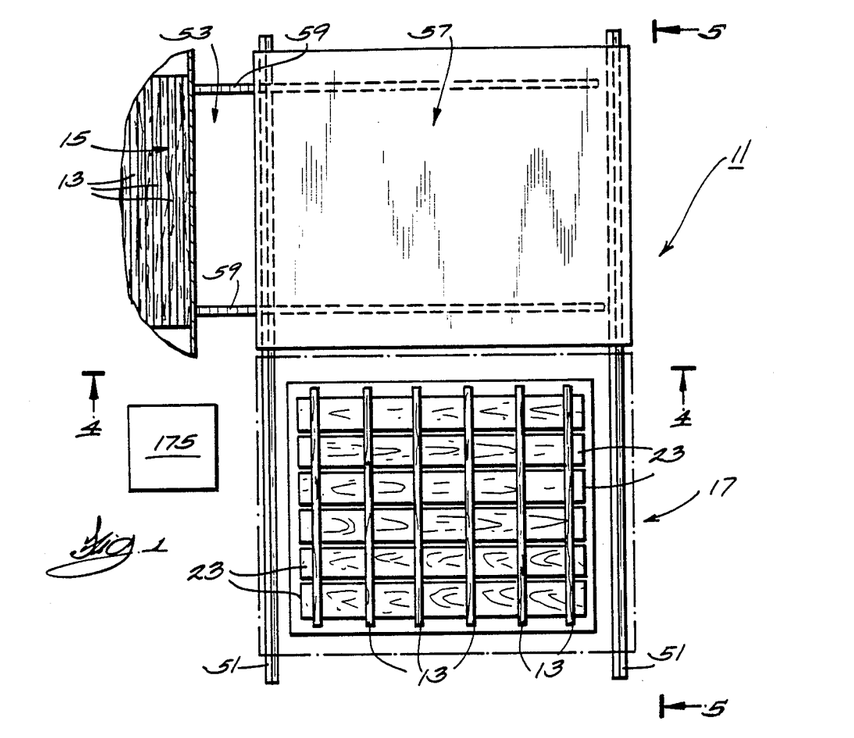
FIG. 1 is a partially schematic view of apparatus embodying various of the features of the invention.
Figure 2:
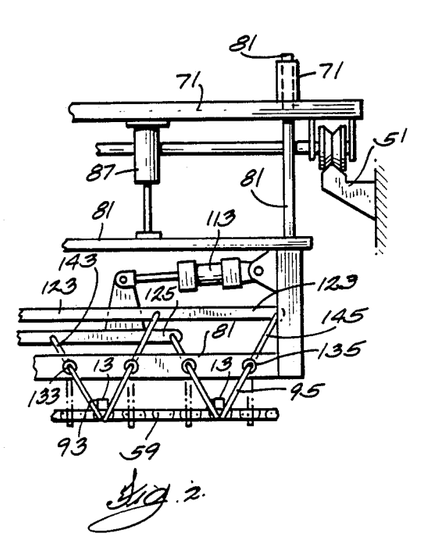
FIGS. 2 and 3 are fragmentary views illustrating a portion of the apparatus shown in FIG. 1 with some of the components being located in different positions.

Shown in FIG. 1 of the drawings is apparatus 11 for transporting sticks 13 from a stick supply station 15 and for depositing the sticks 13 at a stacking station 17 (FIGS. 1 and 5) so as to separate successive layers 19 (FIG. 5) of a stack 21 of articles 23, such as lumber or pipe or other similar articles.

The stacking station 17 is conventional and includes (see FIG. 5) an elevator 25 on which successive layers 19 of articles are deposited to form the stack 21. Any conventional means can be employed for delivering the articles 23 to the elevator 25 and the construction of such means is not a part of the invention disclosed herein.

Figure 5:
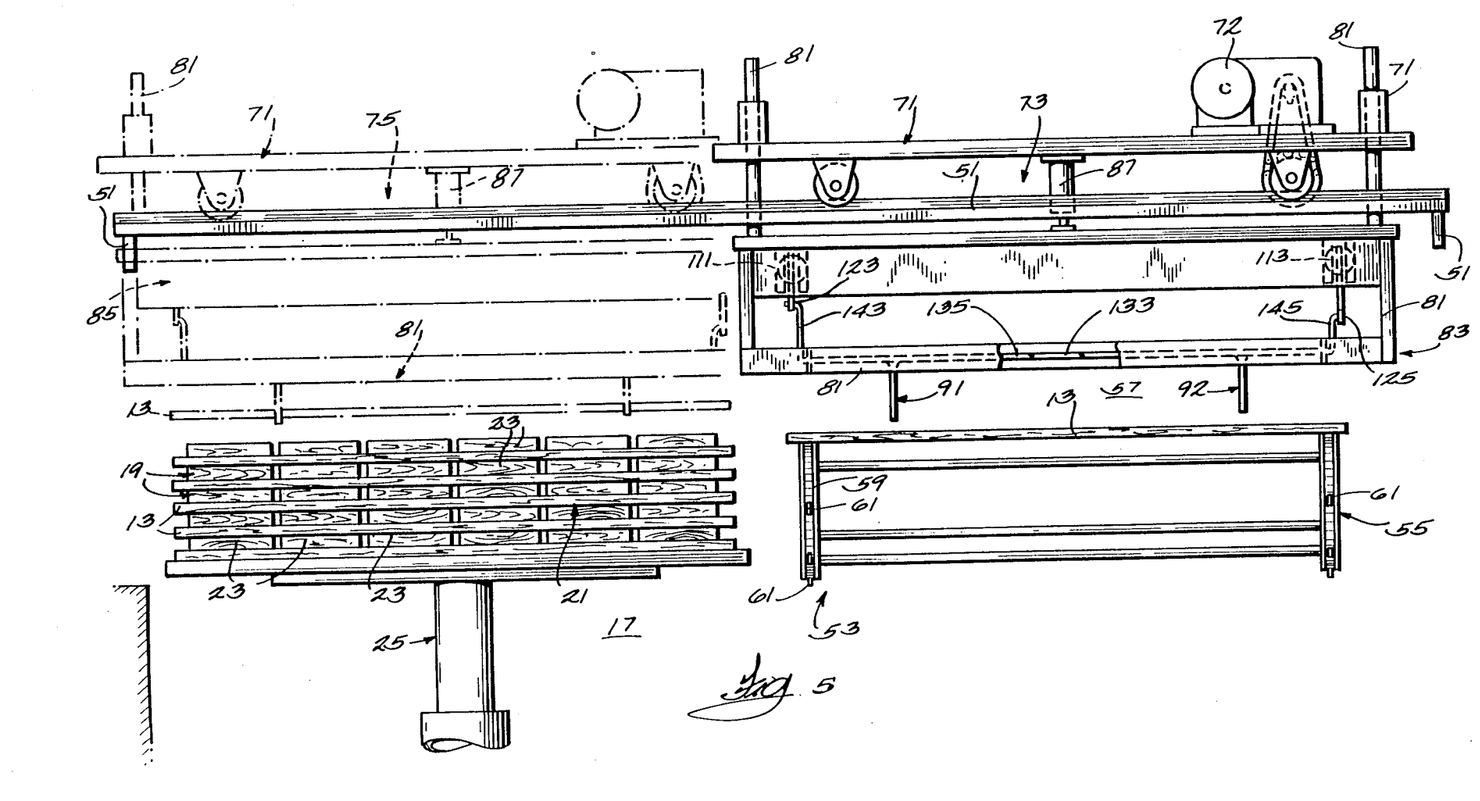
FIG. 5 is an enlarged sectional view taken along line 5—5 in FIG. 1, with a portion of the apparatus shown in dotted outline in an alternate position.

After each deposit of a layer 19 of articles 23, the elevator 25 is lowered, by any suitable means, to present the top surface of the articles 23 at a preselected height which facilitates placement on the stack 21 of a predetermined plurality of separator sticks 13 located in generally parallel spaced relation to each other in a predetermined pattern.

After deposit of the separator sticks 13, another layer 19 of articles 23 is deposited to build the stack 21. When the stack 21 reaches a predetermined height, the stack is removed by suitable means, not a part of the invention, and the elevator 25 is again raised to a level adapted to receive the bottom layer of the next stack, followed by deposit of the predetermined plurality of separator sticks 13 in the predetermined pattern.

The separator sticks 13 are preferably elongated pieces of wood, something close to $1\frac{1}{4}$ by $1\frac{1}{4}$ inch and about six to ten feet long, depending upon the type of articles being stacked. Other materials can also be used.

The apparatus 11 disclosed herein receives separator sticks 13 from an unscrambler (not shown) which is located at the supply station 15 and which is not a part of the invention, arranges successive predetermined pluralities of the sticks in a predetermined spaced parallel relation to one another, and delivers each plurality of sticks in the predetermined arrangement to the stacking station 17.

More particularly, the delivery apparatus 11 comprises a frame 51 which can be constructed in any suitable fashion to support the various components of the delivery apparatus 11.

The delivery apparatus 11 also includes a supply conveyor 53 which is supported by the frame 51 by suitable means and which includes conveyor means 55 movable between the supply station 15 and a transfer station 57, and which includes means for delivering successive pluralities of sticks in predetermined spaced apart parallel relation to the transfer station 57.

Figure 4:
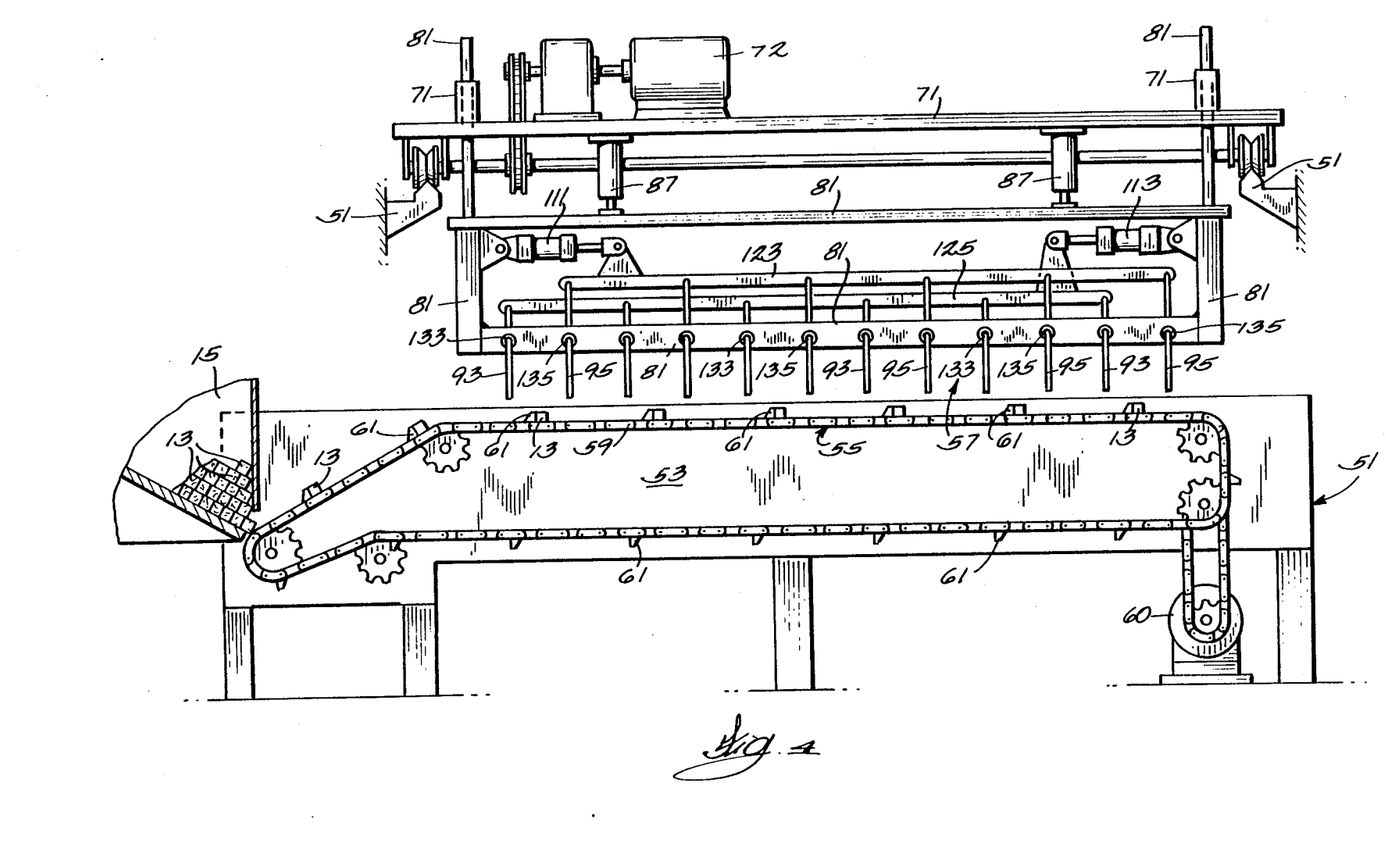
FIG. 4 is an enlarged sectional view, partially in cross section, and taken generally along line 4—4 in FIG. 1.

While various arrangements can be employed, in the disclosed construction, such conveyor means 55 comprises (see FIG. 4) a pair of spaced parallel endless members which can be in the form of a pair of chains 59, and which are suitably supported for travel from the supply station 15 to the transfer station 57 around an endless path. The chains 59 can be four or more feet apart, depending on the length of the sticks.

While various arrangements can be employed for arranging the sticks 13 in the predetermined pattern, in the disclosed construction, such means includes, on each chain 59, a series of cleats or lugs 61 which are spaced apart from one another at the predetermined spacing (which can be 12 inches) and which, incident to passage through the supply station 15, engage the sticks 13 to cause successive stick removal from the supply station 15 and transport the sticks 13 in parallel spaced relation to the transfer station 57. Any suitable means such as the motor 60 can be employed for powering and sequentially activating the conveyor means 55 so as to deliver a predetermined number of sticks 13 in the predetermined parallel spacing to the transfer station 57.

Upon arrival at the transfer station 57 of a plurality of sticks 13, the conveyor means 55 is stopped to facilitate removal of the sticks 13 from the conveyor means 55. After such removal, conveyor means 55 is again actuated to advance another plurality of sticks to the transfer station 57.

The delivery apparatus 11 also includes (see FIGS. 2-5) a carriage 71 which is suitably supported on the frame 51 by any suitable guide means for movement between a stick pick-up position 73 (FIG. 5) adjacent the transfer station 57, and a stick delivery position 75 (shown in dotted outline in FIG. 5) adjacent the stacking station 17. Movement from the pick-up position to the delivery position serves to transport a plurality of the sticks 13 from the transfer station 57 to the stacking station 17 without altering the predetermined relation of the sticks 13 to one another.

Any suitable means, such as the motor 72 and associated drive (see FIG. 5) can be employed to displace the carriage 71 between the pick-up and delivery positions.

Figure 3:
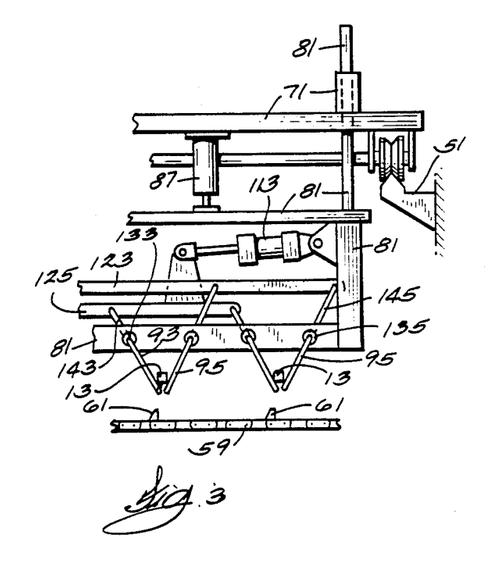

The delivery apparatus 11 also includes a sub-frame 81 which is supported on the carriage 71 by any suitable means for movement in common with the carriage 71 and for movement relative to the carriage between a lower position 83 (FIG. 2) and a raised position 85 (FIG. 3).

Any suitable means can be employed for displacing the sub-frame 81 between the lower and raised positions 83 and 85. In the disclosed construction, such means comprises a plurality of two way cylinders 87 supported by the carriage 71 and actuated by a suitable control means which is shown schematically at 175 (FIG. 1), and which also controls movement of the conveyor means 55, as well as the carriage 71 and the fingers still to be disclosed.

The delivery apparatus 11 further includes means on the sub-frame for successively engaging each plurality of sticks 13 so as to hold or retain the sticks 13 during raising of the sub-frame 81 and during travel of the carriage 71 from the transfer station 57 to the stacking station 17 and for releasing the sticks 13 when the carriage 71 is in the delivery position 75 and the sub-frame 81 is in the raised position 85.

While various constructions can be employed, in the disclosed construction, such means for engaging and holding the sticks 13 includes, for each stick 13 in each plurality, first and second pairs 91 and 92 (see FIG. 5) of fingers 93 and 95 (see FIGS. 2, 3 and 4), which finger pairs 91 and 92 are spaced in the direction of elongation of the sticks 13. The fingers 93 and 95 in each of the pairs 91 and 92 comprise elongated levers which are pivotally supported on the sub-frame 81 for movement between a stick engaging position, shown in FIG. 2, wherein the fingers 93 and 95 converge toward each other and engage the underside of an associated stick 13, and a spread or release position wherein the fingers 93 and 95 are sufficiently spaced apart to permit passage between the fingers of the associated stick 13.

Various means can be employed for supporting and displacing the fingers 93 and 95 between the stick engaging and the stick releasing positions. In the disclosed construction such means includes (See FIG. 4) a pair of two-way hydraulic cylinders 111 and 113, and a linkage system supporting the fingers 93 and 95 and connecting the cylinders 111 and 113 to the fingers 93 and 95.

More particularly, the cylinders 111 and 113 are supported on the sub-frame 81 by suitable means for common movement therewith and are respectively operatively connected to a pair of shuttles 123 and 125 which are supported on the sub-frame 81 for longitudinal movement generally parallel to the direction of travel of the endless members or chains 59. One of the fingers 93 of each pair is operatively connected to the shuttle 123 and the other finger 95 in each pair is operatively connected to the other shuttle 125. Such connections include fixed connection of the fingers 93 with respective rock shafts 133 supported by the sub-frame 81 for rotation about respectively fixed axes and fixed connection of the other fingers 95 with respective rock shafts 135 supported by the sub-frame 81 for rotation about respectively fixed axes in generally parallel relation to the first mentioned rock shafts 133.

In turn, the rock shafts 133 are fixedly connected to respective cranks 143 which in turn are coupled with the shuttle 125 so that longitudinal shuttle movement results in rotation of the rock shafts 133 and attached fingers 93. In addition, the rock shafts 135 are fixedly connected to respective cranks 145 which, in turn, are coupled with the shuttle 123 so that longitudinal shuttle movement results in rotation of the rock shafts 135 and attached fingers 95.

The fingers 93 and 95 are displaced toward each other to the stick engaging positions by movement of the shuttles 123 and 125 in opposite directions away from each other, i.e., by movement (See FIGS. 2 and 3) of the shuttle 123 to the right and by movement of the shuttle 125 to the left.

The fingers 93 and 95 are displaced away from each other to the spread positions by movement of the shuttles 123 and 133 in opposite directions toward each other, i.e., by movement of the shuttle 123 to the left and by movement of the shuttle 125 to the right.

In operation, the supply conveyor 53 is initially energized to remove from the supply station 15 a plurality of sticks 13, to locate the sticks 13 in parallel relation at a fixed spacing to one another, and to transport the arrangement of sticks 13 to the transfer station 57. At the transfer station 57, the supply conveyor 53 is de-energized. With the carriage 71 in the pick-up position, the sub-frame 81 is moved to the lowered position, and the hydraulic cylinders 111 and 113 are then actuated to cause the fingers 93 and 95 to move from the spread positions to the stick engaging positions with the outer or lower ends of the fingers 93 and 95 located below the strips 13 so that, upon upward movement of the sub-frame 81, the sticks 13 will be lifted off the supply conveyor 53. After such upward movement of the sub-frame 81 to the raised position, thus picking up the sticks 13, the carriage 71 is actuated so as to move to the delivery position and transfer the sticks 13 to the stacking station 17, just above the most recently delivered layer 19 of articles 23. The hydraulic cylinders 111 and 113 are then actuated to displace the fingers 93 and 95 from their stick engaging positions to their stick releasing positions, thereby dropping the sticks 13 through a short distance onto the stack 21. Thereafter, the carriage 71 is displaced back to the pick-up station and the sub-frame 81 is moved to its lowered position to pick-up a new plurality of sticks 13 which have already been delivered to the transfer station 57.

If desired, the sub-frame 81 can be lowered as necessary or desirable to lessen the distance through which the sticks 13 are dropped or to more closely approach the stack 21 before releasing the sticks.

At the time the carriage 71 is returning to the pick-up position, the supply conveyor 53 is actuated to deliver the next plurality of sticks to the transfer station.

Any suitable means well known in the art can be employed to sequentially actuate the supply conveyor 53, the carriage 71, the sub-frame 81, and the fingers 93 and 95. Because such control means are believed to be well known in the art, a further disclosure thereof is believed to be unnecessary and such control means is shown schematically in the drawings at 175.

Figures 6, 8:
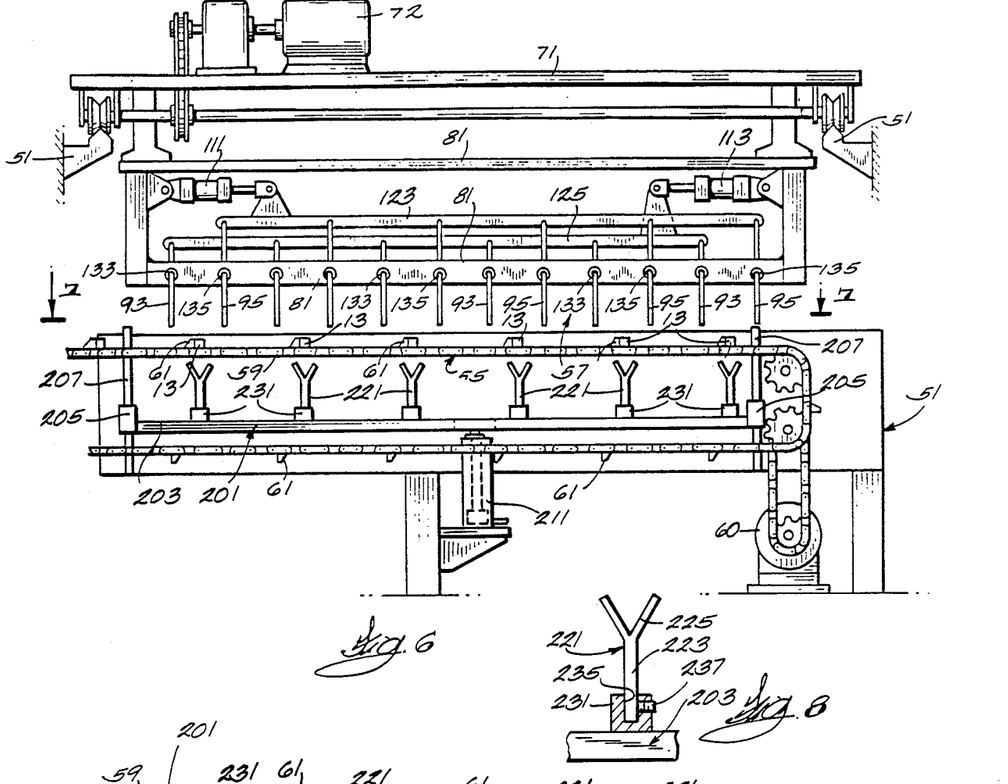
FIG. 6 is a view similar to FIG. 4 including another embodiment of the invention.
FIG. 8 is an enlarged view of portion of the construction shown in FIG. 6.
Figure 7:
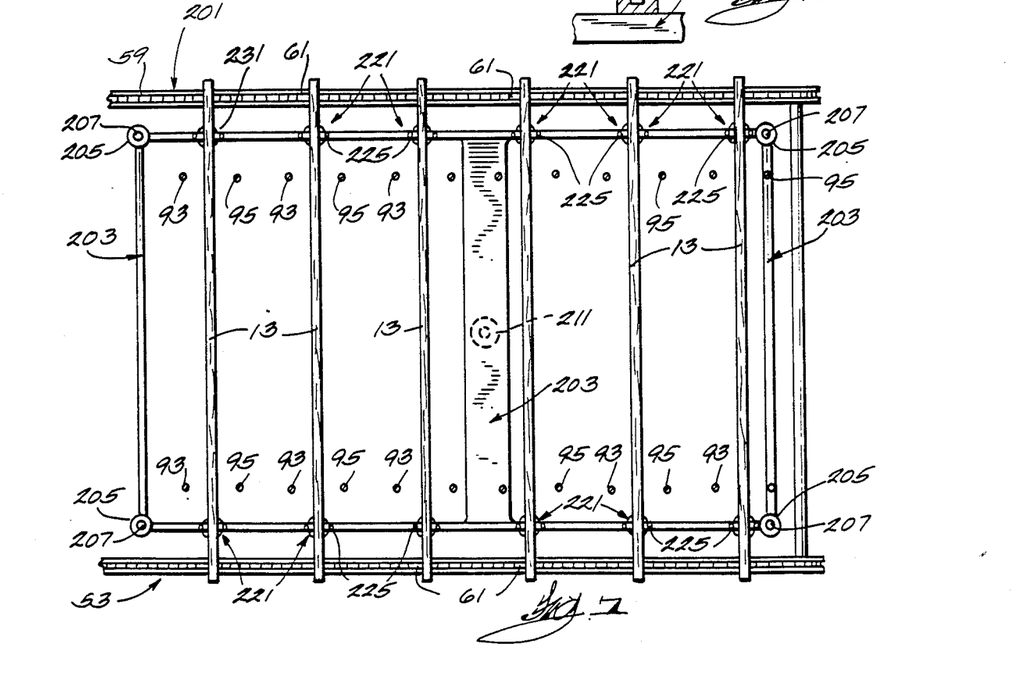
FIG. 7 is a view taken generally along lines 6—6 of FIG. 6.

Shown in FIGS. 6 through 8 is another embodiment of the invention, which embodiment is generally the same as that disclosed in FIGS. 1 through 4 except that the vertically movable sub-frame 81 carried by the carriage 71 has been omitted and that, in lieu thereof, means 201 are provided for raising the sticks 13 from the supply conveyor 53 into the grasp of the fingers 93 and 95 which, in the embodiment shown in FIGS. 6 through 8, are directly carried on the carriage 71.

Where the components in the embodiment shown in FIGS. 6 through 8 are generally the same as in the embodiment shown in FIGS. 1 through 4, the same reference numerals have been employed to refer to the same components and no further explanation is provided.

More specifically, in the construction shown in FIGS. 6 through 8, the finger rock shafts 133 and 135 and finger operating hydraulic cylinders 111 and 113 are directly carried by the carriage 71. In addition, while other arrangements can be employed, in the disclosed construction, the stick raising means 201 comprises a generally rectangular sub-frame 203 which includes a plurality of uprights or legs or bushings 205 which are vertcially movably received by four rods or supports 207 fixed on the frame 51, whereby to afford vertical up and down movement of the sub-frame 203. Connected between the sub-frame 203 and the frame 51 is suitable means for raising and lowering the sub-frame 203, which means, in the construction shown in FIG. 5, comprises one or more hydraulic or pneumatic cylinder-piston assemblies 211.

Removably vertically supported on the sub-frame 203 are a plurality of stick lifters 221 which are generally of Y-shape and which respectively include lower stems 223 and upper V-shape stick engaging portions 225. While other arrangements can be employed, the sticks 221 are removably supported on the sub-frame 203, as shown in FIG. 8, by means including respective support blocks 231 fixed on the sub-frame 203 and having therein respective vertical bores 235 for removable receipt therein of at least a portion of the lifter stems 223. Set screws 237 can be employed to releasably hold the lifter stems 223 in the support blocks 231.

As shown in FIG. 7, one support block 231 is provided on the sub-frame 203 in laterally adjacently outward but otherwise generally vertically aligned relation with each pair of fingers 93 and 95 on the carriage 71. Thus, one of the lifters 221 is associated with each pair of fingers 93 and 95.

In operation, when the carriage 71 is in the transfer or pick-up station 57, the cylinder-piston assemblies 221 are actuated to raise the sub-frame 203, thereby elevating the lifters 221 from a retracted position below the supply conveyor 53 so as to engage each stick 13 by a pair of lifters 221, and so as to raise the sticks 13 to a position above the lower ends of the fingers 93 and 95 and so that the fingers 93 and 95 can be actuated to engage the undersurface of the sticks 13 and to support the sticks 13 for transfer from the transfer or pick-up station 57 as already explained.

After the fingers 93 and 95 have grasped the sticks 13, the sub-frame 203 is then downwardly displaced by the cylinder-piston assemblies 211 to a position wherein the Y-finger engaging portions 225 of the lifters 221 are located below the supply conveyor 53 to prevent interference with travel of the sticks 13 into position for transfer to the carriage 71 in the next cycle.

The disclosed arrangement facilitates adjustment to accommodate stacking of objects of different lengths as, for instance, objects of eight (8) feet and twelve (12) feet. When stacking objects of differing length, a greater number of sticks 13 are usually required as compared to stacking objects of lesser lengths. Accordingly, removability of the lifters 221 from the support blocks 231 permits the apparatus to function to lift a different numbers of sticks 13 to accommodate stacking of objects of different lengths. Appropriate adjustment to cycling of the supply conveyor 53 can also be provided to accommodate supply to the transfer or pick-up station 57 of a lesser or greater number of sticks 13 at the same time and for stick transfer from the supply conveyor 53 to the carriage 71.

Various of the features of the invention are set forth in the following claims.

I claim:

1. Apparatus for delivering separator sticks to a stacking station, said apparatus comprising a frame, a stick conveyor supported on said frame for movement between a stick supply station and a stick transfer station horizontally spaced from the stick supply station and from the stacking station and including means for transporting sticks from the supply station and for delivering to the transfer station a predetermined plurality of the sticks in a predetermined spaced and parallel relation to one another, carriage means supported on said frame for movement relative to said frame between a pick-up position adjacent the transfer station and delivery position horizontally spaced from the pick-up position and adjacent the stacking station, and means mounted on said carriage means and moveable in common therewith for engaging the predetermined plurality of sticks in the predetermined spaced and parallel relation to one another and located on said conveyor at the transfer station when said carriage means is in the pick-up position, for retaining the plurality of sticks in the predetermined spaced and parallel relation to one another during movement of said carriage means from the pick-up position to the delivery position, and for releasing the predetermined plurality of sticks in the predetermined spaced and parallel relation to one another at the stacking station when said carriage means is in the delivery position, said stick engaging, retaining, and releasing means comprising first and second fingers, means pivotally supporting said fingers on said sub-frame for movement between a stick engaging position wherein said fingers extend toward one another so as to support a stick from the underside thereof and a spread position wherein said fingers are separated from each other sufficiently to permit passage therebetween of a stick.

2. Apparatus for delivering separator sticks to a stacking station, said apparatus comprising a frame, a stick conveyor supported on said frame for movement between a stick supply station and a stick transfer station horizontally spaced from the stick supply station and from the stacking station and including means for transporting sticks from the supply station and for delivering to the transfer station a predetermined plurality of the sticks in a predetermined spaced and parallel relation to one another, carriage means supported on said frame for movement relative to said frame between a pick-up position adjacent the transfer station and a delivery position horizontally spaced from the pick-up position and adjacent the stacking station, a sub-frame supported by said carriage means for movement in common therewith and for movement relative to said carriage means between a lower position and a raised position, and means on said sub-frame for engaging the predetermined plurality of sticks in the predetermined spaced and parallel relation to one another and located on said conveyor at the transfer station when said carriage means is in the pick-up position and when said sub-frame is in the lower position, for retaining the predetermined plurality of sticks in the predetermined spaced and parallel relation to one another during carriage means movement from the pick-up position to the delivery position, and for releasing the predetermined plurality of sticks in the predetermined spaced and parallel relation to one another at the stacking station when said carriage means is in the delivery position, said stick engaging, retaining, and releasing means comprising first and second fingers, means pivotally supporting said fingers on said sub-frame for movement between a stick engaging position wherein said fingers extend toward one another so as to support a stick from the underside thereof and a spread position wherein said fingers are separated from each other sufficiently to permit passage therebetween of a stick.

3. Apparatus in accordance with claim 2 wherein said means for supporting said fingers on said sub-frame is also operative for displacing said fingers between the stick engaging position and the spread position.

4. Apparatus in accordance with claim 3, wherein said finger supporting and displacing means comprises first and second rock shafts rotatably supported by said sub-frame and respectively fixed to said first and second fingers for rotation of said fingers in common with said rock shafts, and means for rotating said rock shafts.

5. Apparatus in accordance with claim 2 wherein said conveyor includes a pair of endless members each having thereon a series of spaced lugs adapted to respectively engage the sticks so as to cause, in response to endless member movement, transport of the sticks from the supply station and delivery of the predetermined plurality of sticks in spaced parallel to the transfer station.

6. Apparatus for delivering separator sticks to a stacking station, said apparatus comprising a frame, a stick conveyor supported on said frame for movement between a stick supply station and a stick transfer station and including means for transporting sticks from the supply station and for delivering to the transfer station a predetermined plurality of the sticks in a predetermined spaced and parallel relation to one another, carriage means supported on said frame for movement relative to said frame between a pick-up position adjacent the transfer station and a delivery position adjacent the stacking station, a sub-frame supported by said carriage means for movement in common therewith and for movement relative to said carriage means between a lower position and a raised position, and means on said sub-frame for engaging the predetermined plurality of sticks located on said conveyor at the transfer station when said carriage means is in the pick-up position and when said sub-frame is in the lower position, and for releasing the sticks at the stacking station when said carriage means is in the delivery position, said stick engaging and releasing means comprising first and second fingers, means pivotally supporting said fingers on said sub-frame for movement between a stick engaging position wherein said fingers extend toward one another so as to support a stick from the underside thereof and a spread position wherein said fingers are separated from each other sufficiently to permit passage therebetween of a stick, and for displacing said fingers between the stick engaging position and the spread position, said finger supporting and displacing means comprising first and second rock shafts rotatably supported by said sub-frame and respectively fixed to said first and second fingers, and means for rotating said rock shafts comprising first and second elongated shuttles, means on said sub-frame supporting said shuttles for reciprocative movement in the direction of shuttle elongation, means for simultaneously displacing said shuttles in opposite directions, and means respectively connecting said first and second rock shafts with said first and second shuttles for effecting rotation of said rock shafts in opposite directions in response to shuttle movement in opposite directions.

7. Apparatus in accordance with claim 6 wherein said connecting means includes first and second cranks respectively fixedly connected to said first and second rock shafts, and first and second means respectively coupling said first and second cranks to said first and second shuttles for rotating said cranks in opposite directions in response to shuttle movement in opposite directions.

8. Apparatus in accordance with claim 6 wherein said means for displacing said first and second shuttles comprises first and second hydraulic cylinders supported by said sub-frame and respectively connected to said first and second shuttles.

9. Apparatus for delivering separator sticks to a stacking station, said apparatus comprising a frame, a stick conveyor supported on said frame for movement between a stick supply station and a stick transfer station and including means for transporting sticks from the supply station and for delivering to the transfer station a predetermined plurality of the sticks in a predetermined spaced and parallel relation to one another, carriage means supported on said frame for movement relative to said frame between a pick-up position adjacent the transfer station and a delivery position adjacent the stacking station, and means on said carriage means for engaging the predetermined plurality of sticks located on said conveyor at the transfer station when said carriage means is in the pick-up position, and for releasing the sticks at the stacking station when said carriage means is in the delivery position, said stick engaging and releasing means including, for each stick in the plurality of sticks, two pairs of first and second fingers, said pairs of fingers being spaced from each other in the direction of stick elongation, and first and second rock shafts being supported on said carriage means for rotation and respectively connected to said first and second fingers, and said stick engaging and releasing means also including means for rotating said first rock shaft and said second rock shaft in opposite directions so as to rock said fingers between stick engaging positions wherein said fingers extend toward one another so as to support a stick from the underside thereof and spread positions wherein said fingers are separated from each other sufficiently to permit passage therebetween of a stick, said rock shaft rotating means including first and second elongated shuttles supported by said carriage means for generally parallel movement in the direction of shuttle elongation, first and second hydraulic cylinders supported by said sub-frame and respectively connected to said first and second shuttles, and means respectively connecting said first and second shuttles to said first and second rock shafts for rotating said rock shafts in opposite directions in response to shuttle movement in opposite directions.

10. Apparatus for delivering elongated separator sticks to a stacking station, said apparatus comprising, a frame, a stick conveyor supported on said frame for movement between a stick supply station and a stick transfer station and including a pair of endless chains each having thereon a series of spaced lugs adapted to respectively engage the sticks so as to cause, in response to chain movement, transport of the sticks from the supply station and delivery to the transfer station of a predetermined plurality of the sticks in spaced and parallel relation, carriage means supported on said frame for movement relative to said frame between a pick-up position adjacent the transfer station and a delivery position adjacent the stacking station, a sub-frame supported by said carriage means for movement in common therewith and for movement relative to said carriage means between a lower position and a raised position, means on said sub-frame for engaging the predetermined plurality of sticks located on said conveyor at the transfer station when said carriage means is in the pick-up position and when said sub-frame is in the lower position, and for releasing the sticks at the stacking station when said carriage means is in the delivery position and said sub-frame is in the raised position, said stick engaging and releasing means including, for each stick in the predetermined plurality of sticks, two pairs of first and second fingers, said two pairs of fingers being spaced from each other in the direction of stick elongation, and first and second rock shafts supported by said sub-frame for rotation and respectively fixed to said first and second fingers, said stick engaging and releasing means also including means for rotating said first and second rock shafts in opposite directions so as to rock said fingers between stick engaging positions wherein said fingers extend toward one another so as to support a stick from the underside thereof and spread positions wherein said fingers are separated from each other sufficiently to permit passage therebetween of a stick, said rock shaft rotating means including first and second elongated shuttles supported by said sub-frame for generally parallel movement in the direction of shuttle elongation, first and second hydraulic cylinders supported by said sub-frame and respectively connected to said first and second shuttles, and means respectively connecting said first and second shuttles to said first and second rock shafts for rotating said rock shafts in opposite directions in response to shuttle movement in opposite directions.

11. Apparatus in accordance with claim 10 wherein said connecting means includes first and second cranks respectively fixedly connected to said first and second rock shafts, and first and second means respectively coupling said first and second cranks to said first and second shuttles for rotating said cranks in opposite directions in response to shuttle movement in opposite directions.

12. Apparatus for delivering separator sticks to a stacking station, said apparatus comprising a frame, a stick conveyor supported on said frame for movement between a stick supply station and a stick transfer station horizontally spaced from the stick supply station and from the stacking station and including means for transporting sticks from the supply station and for delivering to the transfer station a plurality of the sticks in a predetermined spaced and parallel relation to one another, means on said frame adjacent said transfer station for lifting the predetermined plurality of sticks in the predetermined spaced and parallel relation to one another from said conveyor to a raised position above said conveyor, carriage means supported on said frame for movement relative to said frame between a pick-up position adjacent the transfer station and a delivery position horizontally spaced from the pick-up station and adjacent the stacking station, and means on said carriage means and movable in common therewith for engaging the predetermined plurality of sticks in the predetermined spaced and parallel relation to one another when the sticks are located in the raised position and when said carriage means is in the pick-up position, for retaining the predetermined plurality of sticks in the predetermined spaced and parallel relation to one another during carriage means movement from the pick-up position to the delivery position and for releasing the predetermined plurality of sticks in the predetermined spaced and parallel relation to one another at the stacking station when said carriage mean sis in the delivery position.

13. Apparatus in accordance with claim 12 wherein said stick lifting means includes a sub-frame carried by said frame for vertical movement, means connected between said frame and said sub-frame for vertically moving said sub-frame, and a plurality of stick lifters carried by said sub-frame in position to lift the sticks from said stick conveyor in response to upward displacement of said sub-frame.

* * * * *